UNITED STATES PATENT OFFICE.

BENNO HOMOLKA, OF FRANKFORT-ON-THE-MAIN, AND RICHARD WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF MAKING ALPHA-OXYTHIONAPHTHENES.

No. 894,004.  Specification of Letters Patent.  Patented July 21, 1908.

Application filed February 5, 1907. Serial No. 355,872.

*To all whom it may concern:*

Be it known that we, BENNO HOMOLKA, Ph. D., and RICHARD WELDE, Ph. D., chemists, citizens of the Empire of Germany, and residing at Frankfort-on-the-Main and Höchst-on-the-Main, Germany, respectively, have invented certain new and useful Improvements in Making Alpha-Oxythionaphthenes, of which the following is a specification.

We have found that alpha-oxythionaphthene

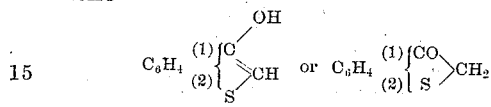

may be obtained, if methylthiophenol-o-carboxylic acid, $$C_6H_4\begin{cases}COOH\ (1)\\ S-CH_3\ (2)\end{cases}$$

its salts or esters be heated with alkaline condensing agents. If the substitution products of methylthiophenal-ortho-carboxylic acid be used, substituted alpha-oxythionaphthenes are obtained. As alkaline condensing agents are specially to be considered caustic alkalies and alkaline earths, alkali and alkaline earth metals by themselves or in form of alloys or amalgams, alkaline alcoholates and dialkaline salts of cyanamid. The alpha-oxy-thionaphthenes thus obtained yield by the action of oxidizing agents valuable dye-stuffs.

*Example I.* A mixture of 10 parts by weight of methylthiophenol-o-carboxylic acid methyl ester, 8 parts by weight of sodium or potassium alcoholate and 30—50 parts by weight of an approximately molecular mixture of potassium and sodium hydroxid is made to melt. At about 150° C occurs the formation of alpha-oxythionaphthene which is complete at about 200° C. When cold the mass is dissolved in water and the alpha-oxythionaphthene is isolated after adding an excess of carbonic or mineral acid by filtration or distilling over by means of steam. It may be transformed into a red vat dyestuff by means of oxygen of the air or artificial oxidizing agents.

In the above example may be substituted for alkali alcoholate the disodium-cyanamid under otherwise like or similar conditions.

*Example II.* A thorough mixture of 10 parts by weight of sodium methylthiophenol-o-carboxylate, 10 parts by weight of finely pulverized quick-lime and 30—50 parts of a molecular mixture of caustic potash and caustic soda is made to melt. The formation of alpha-thionaphthene occurs at about 200° C; it is, however, preferable to somewhat raise the temperature and to maintain it till no further methylthiophenol-o-carboxylic acid can be traced in a test portion dissolved in water and acidified with hydrochloric acid. The alpha-oxythionaphthene further worked up and isolated is similar to that described in Example I.

*Example III.* Into 100 parts by weight of an approximately molecular mixture of caustic potash and caustic soda heated to about 200° C are introduced while stirring 20 parts by weight of an alloy of sodium (10 per cent.) and lead and 10 parts by weight of the sodium salt of meta-methyl-thiocresol-ortho-carboxylic acid, keeping the fusion at this temperature, till no further meta-methyl-thiocresol-ortho-carboxylic acid can be traced. When cold the mass is extracted with water and the solution is converted in the usual manner into methyl-alpha-oxy-thionaphthene. When oxidized it yields a vat dyestuff dyeing wool and cotton in red tints.

*Example IV.* One part by weight of sodium methylthiophenol-p-ethoxy-o-carboxylate is introduced into about 10 parts by weight of a molecular mixture of caustic potash and caustic soda heated to 180° C.; the temperature is raised to about 200—210 and the melt maintained at it while stirring, till any unchanged parent material is no longer traced. When cold the mass is dissolved in water and the alpha-oxythionaphthene thus obtained is separated in the usual manner. It may be transformed by means of oxidizing agents into a dyestuff dyeing in the vat wool and cotton in violet tints.

Having now described our invention, what we claim is:

The herein described process of making alpha-oxythionaphthenes, which consists in heating the salts of methylthiophenol-ortho-carboxylic acids with alkaline condensing agents.

In testimony, that we claim the foregoing as our invention, we have signed our names in presence of two subscribing witnesses.

BENNO HOMOLKA.
RICHARD WELDE.

Witnesses:
JEAN GRUND,
CARL GRUND.